United States Patent [19]

Kryder et al.

[11] Patent Number: 5,184,335
[45] Date of Patent: Feb. 2, 1993

[54] METHOD AND SYSTEM FOR ERASING PREVIOUSLY RECORDED DOMAINS IN A MAGNETO-OPTIC RECORDING MEDIUM

[75] Inventors: Mark H. Kryder, Allegheny; Han-Ping D. Shieh, Pittsburgh, both of Pa.

[73] Assignee: Movid Information Technology, Inc., Schenectady, N.Y.

[21] Appl. No.: 700,882

[22] Filed: May 10, 1991

Related U.S. Application Data

[63] Continuation of Ser. No. 279,255, Nov. 28, 1988, abandoned, which is a continuation-in-part of Ser. No. 33,931, Apr. 4, 1987, abandoned, which is a continuation of Ser. No. 837,130, Mar. 19, 1986, abandoned.

[51] Int. Cl.$^5$ ............... G11B 13/04; G11B 11/10; G11B 11/12
[52] U.S. Cl. .................. 369/13; 360/59; 360/114; 365/122
[58] Field of Search .................. 369/13, 14, 288; 360/59, 114; 365/122; 428/694

[56] References Cited

U.S. PATENT DOCUMENTS

| | | | |
|---|---|---|---|
| 3,949,387 | 4/1976 | Chaudhari et al. | 365/122 |
| 3,965,463 | 6/1976 | Chaudhari et al. | 340/174 |
| 3,965,465 | 6/1976 | Chaudhari et al. | 340/527 |
| 4,469,881 | 2/1986 | Freese et al. | 556/453 |
| 4,586,161 | 4/1986 | Skoda | 365/122 |
| 4,649,519 | 3/1987 | Sun et al. | 365/122 |
| 4,701,881 | 10/1987 | Tanaka et al. | 360/135 |

FOREIGN PATENT DOCUMENTS

| | | |
|---|---|---|
| 58-50639 | 3/1983 | Japan ............ 369/13 |
| 113506 | 6/1984 | Japan . |
| 113507 | 6/1984 | Japan . |
| 61-50235 | 3/1986 | Japan . |

OTHER PUBLICATIONS

Fay et al, "Hermetically Sealed Optical Plastic Substrate" Xerox Disclosure Journal, vol. 8, No. 3, May/-Jun., 1983 pp. 279-280.
S. Matsushita, K. Sunago and Y. Sakurai, "Thermo Magnetic Writing in GD-CO Sputtered films", *IEEE Transactions on Magnetics*, Sep., 1975, vol. MAG-11 No. 5.
Edward S. Rothchild, "Optical Memories Eye Computer Markets", Feb., 1984, *High Technology*.
Nippon Kogaku K.K., "Overwrite System of Magneto Optical Disk System", International Symposium on Magneto-Optics, Apr., 1987.

*Primary Examiner*—Hoa Nguyen
*Attorney, Agent, or Firm*—Morgan & Finnegan

[57] ABSTRACT

Methods for directly over-writing the binary data value of a bit of digital data, stored in a particular one of a multiplicity of microscopic storage regions of a thin-film magneto-optic recording layer, in the absence of a substantial externally applied bias magnetic field, employ a magnetic material having a compensation temperature a few tens of degrees centigrade above room temperature. A source of energy is energized to heat the particular storage region to a sufficiently high temperature that the self-demagnetization field of the recording layer material inverts the net magnetic moment of that region. Multiple over-writing of the long-term stable stored data values can be provided.

31 Claims, 2 Drawing Sheets

METHOD AND SYSTEM FOR ERASING PREVIOUSLY RECORDED DOMAINS IN A MAGNETO-OPTIC RECORDING MEDIUM

This is a continuation of application Ser. No. 279,255, filed Nov. 28, 1988, now abandoned, which is also a continuation-in-part of co-pending application Ser. No. 033,931, filed on Apr. 3, 1987, now abandoned, which is a continuation of application Ser. No. 837,130, filed Mar. 7, 1986, now abandoned.

BACKGROUND OF THE INVENTION

The present invention relates to processes for the modification of recorded data and, more particularly, to a novel method for the direct over-write modification of digital data stored in domains of a magneto-optical recording media.

It is known to store each binary bit of information in a digital data stream in one associated one of a sequential multiplicity of domains formed in magnetic storage media. While many different types of magnetic media have been hitherto used, including plated wires, toroidal cores, tapes and the like, the particular high-information-density media of interest here is a thin film layer of a magneto-optic recording material, such as amorphous alloys of terbium cobalt (TbCo), gadolinium terbium cobalt (GdTbCo), and the like materials, which alloys allow the binary value of a stored bit of information to be determined by analyzing the effect of each data storage region upon a light beam reflected from the surface of that recording layer region. It is known that, because these ferrimagnetic materials are chosen to have a high coercivity at room temperatures and low coercivity at higher temperatures, heating of a small region of any of these materials can be "written" to have a net magnetization which is not only substantially perpendicular to the surface of the film but is also established in that direction parallel to the direction in which an external (bias) magnetic field was directed at the time when that particular region was heated and allowed to subsequently cool. It is also well known to change the external field direction to encode the data to be stored, and to change the previously stored information by re-heating the film region while an external bias magnetic field is presented in the desired (opposite) direction through the region. However, the speed at which the external field can be made to reverse cannot presently be made as fast as is desired; this form of storage media, while having demonstrated both (1) sufficient data density for the storage of gigabits of information on each disk and (2) short time for access to the previously stored data, has not hitherto allowed the stored data to be modified at any speed even close to the speed at which stored data can be read from the storage disk. For general use, data storage equipment should be capable of writing, reading and/or over-writing data at the same high rate. Accordingly, it is highly desirable to provide a method by which to rapidly modify the data stored in at least one selected one of a multiplicity of microscopic recording regions of a magneto-optical recording medium.

BRIEF SUMMARY OF THE INVENTION

In accordance with one aspect of the present invention, the need for applying an external bias magnetic field to modify previously stored information in a selected region, surrounded by a magnetic domain wall, of a thin film magneto-optic medium, is eliminated by employing as the medium a magnetic material which produces a self-demagnetizing field within said region when reheated. The medium preferably is a single layer and has substantially homogenous magnetic properties. The self-demagnetizing field reverses the net magnetization of the region and therefore the stored information is altered.

In accordance with a further aspect of invention, our novel method for over-writing information in any selected one of a multiplicity of regions of a magneto-optic recording material layer, includes the steps of: reading the binary value of the bit of digital data presently stored in that selected region of the recording layer; determining if the binary value of the recorded bit, as read from the selected region, differs from the binary value of a received new bit of digital data to be stored in that region; and, only if the binary value of the new data bit is different from the presently-stored value, irradiating that region of the recording layer with a beam of energy selected to temporarily raise the temperature of substantially only that region to beyond the compensation temperature of the recording layer material, in the substantial absence of any externally-provided magnetic bias field, to cause self-inversion of the direction of the net magnetization in that region.

In presently preferred embodiments, the magneto-optic recording material is an amorphous alloy of at least one rare-earth element and at least one transition-metal element, and has a compensation temperature only tens of degrees C. above room temperature; alloys of terbium cobalt (TbCo) and gadolinium terbium cobalt (GdTbCo) are especially favored. The required heating of a microscopic region, e.g., a region with a diameter on the order of 1 micron, of the thin film of this material is carried out by a pulse of light energy from a laser diode and the like source. Pulse durations of 10-1000 nanoseconds, at power levels of 1-20 milliwatts, are satisfactory for causing self-inversion of the net magnetic moment of the heated region, and, therefore, of the related stored binary logic value.

Accordingly, it is an object of the present invention to provide a novel method for the modification of the logic value of a bit of digital data stored in a region of a magneto-optic recording medium.

Another object is to provide a recording medium, recording disk and recording system for advantageously implementing the novel method of this invention.

These and other objects will be more clearly appreciated by perusal of the following detailed description of our presently preferred embodiments, especially when considered in conjunction with the drawings.

DETAILED DESCRIPTION OF THE PRESENTLY PREFERRED EMBODIMENTS

Figure 1:
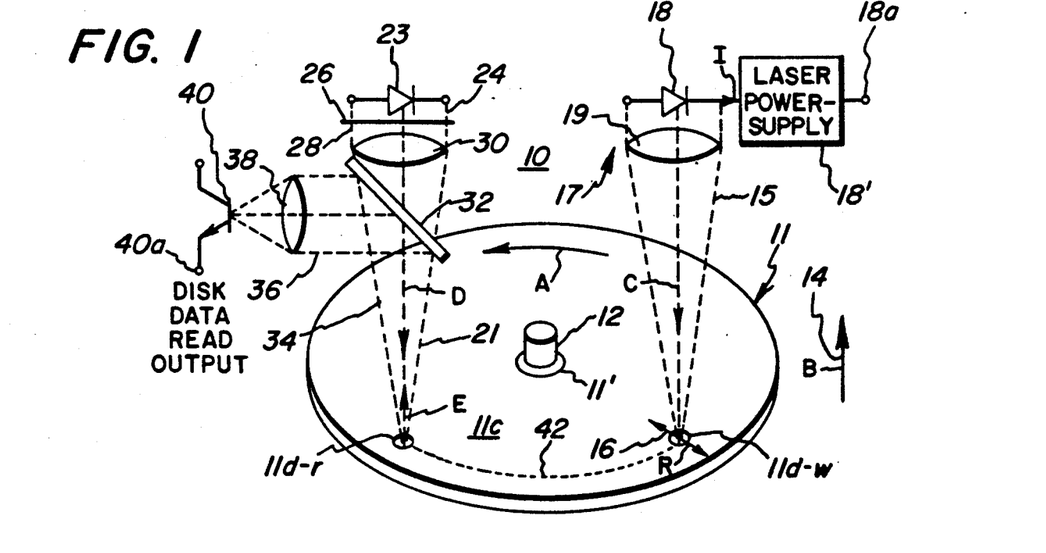
FIG. 1 is a perspective view of a magneto-optic recording disk and the basic apparatus necessary to read and/or over-write digital data from and/or into each of a multiplicity of storage regions therein.
Figure 1A:
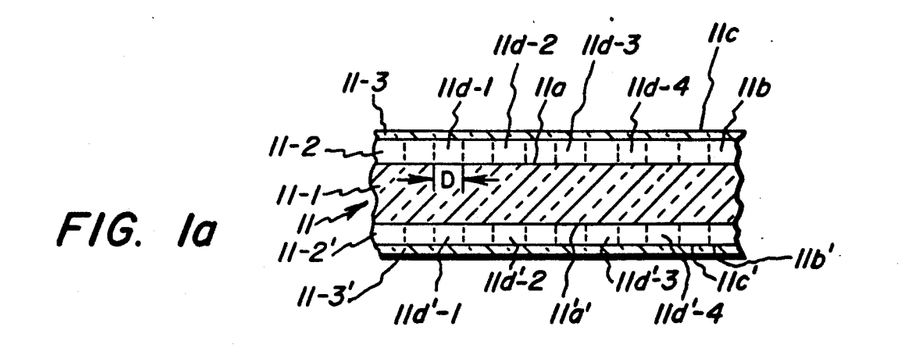
FIG. 1a is a sectional view through a recording disk, and useful in appreciating the various portions and materials thereof.

Referring initially to FIGS. 1 and 1a, apparatus 10, for the magneto-optic storage of digital information, includes a storage disk 11, which may be of cylindrical shape. The disk has a central aperture 11', through which a central spindle member 12 protrudes during operation; the disk is caused to rotate about spindle 12, in the direction of arrow A, by known mechanisms (not shown). The disk 11 is itself comprised of a discoidal substrate member 11-1, formed of a substantially non-magnetic material, such as glass and the like. The substrate has a pair of circular, substantially parallel and spaced apart surfaces 11a and 11a', upon at least one (and preferably both) of which surfaces a thin film 11-2 or 11-2' of the magneto-optic recording material is fabricated, as by sputtering and the like processes. The outwardly-directed circular surface(s) 11b (and 11b', if second layer 11-2' is present) of the recording thin film layer(s) is preferably overcoated with an optically-transparent protective layer 11-3 (or 11-3') of glass and the like. Each recording layer 11-2 or 11-2' is characterized by a multiplicity of microscopic data storage regions 11d, e.g., the consecutive storage regions 11d-1 through 11d-4 defined through the upper recording layer 11-2, and the consecutive storage regions 11d'-1 through 11d'-4 defined through the lower recording layer 11-2'. Each recording region has an average diameter D, on the order of 1 micron. Each recording layer is fabricated of a magneto-optic material, such as an alloy of gadolinium terbium cobalt (GdTbCo), terbium cobalt (TbCo) and the like, which has a compensation temperature $T_c$ higher than the highest expected ambient temperature $T_a$, but much less than the crystallization temperature of the alloy. Compensation temperatures only a few tens of degrees C. above the normal room temperature are preferred.

The binary value of the data bit stored in any one region 11d is initially random, immediately following fabrication of disk 11. Each region is heated to a temperature greater than the compensation temperature $T_c$ while an external initializing bias magnetic field 14, established in a direction (e.g., upwardly, as shown by arrow B) substantially perpendicular to the plane of the disk surface, is caused to pass through the heated region; upon cooling, under the influence of the external field 14, each region has a net magnetic moment directed in the same direction, e.g., upward, as the direction of the initializing bias field 14. This initial magnetic moment direction can be assigned to either binary value, so long as that direction:value assignment is consistently utilized. It should be understood that run-length-limited codings could be used and that each domain could contain more than a single bit of data.

Figures 2A, 2B, 2C:
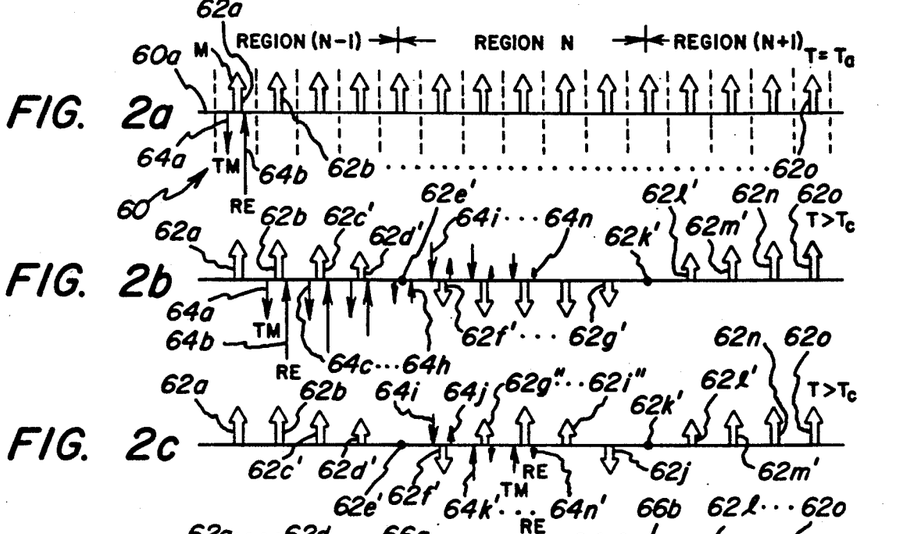
FIGS. 2a-2h are graphical representations of net magnetic moments of several adjacent data bit storage regions, at times before, during and after two successive changes in stored value, and are useful in appreciating the physical mechanism we presently believe to be involved in the operation of our method.

While large amounts of data may be substantially simultaneously written into the initialized memory regions, for the purposes of illustration, we consider a single beam 15 of heating radiation, radially movable along a line 16 so as to be directed to fall at a presently-selected one of a plurality of points presently each defining a selected one of concentric circular tracks of sequentially-located regions 11d-w (although a spiral track can be used); one bit of digital data is to be initially written into each of regions 11d-w. The beam can be formed of optical radiation, as produced by a light source means 17, such as a laser diode 18 and a focussing lens means 19, and will be directed toward the disk, as shown by arrow C. The laser diode produces its optical radiation output responsive to a current I caused to flow therethrough, from an associated laser power supply 18', responsive to reception of a write-enable signal at a control input 18a; advantageously, the current is of pulsed nature, to produce a light pulse signal having a duration from a minimum time interval on the order of 10 nanoseconds to a maximum time interval on the order of 1 microsecond, with power levels on the order of 1-20 milliwatts. The beam focussing means 19 should be configured to focus the beam, at the half-power diameter thereof, to an area having a diameter less than the diameter D of the region to be heated. Thus, localized heating will raise the temperature, and cause a localized decrease in the coercivity, of substantially only the one region (e.g., region N, see FIG. 2) into which data is to be written.

The datum contained in any written region 11d-r can be non-destructively read therefrom by causing a reading light beam of plane-polarized light 21 (of amplitude insufficient to heat to a temperature high enough that the magnetization direction changes in any region upon which the reading beam impinges) to be projected, in the direction of arrow D, toward the disk surface 11c. A portion of the impingent light is reflected from the region surface 11b; the reflected beam polarization is rotated in a direction dependent upon the direction in which the net magnetic moment of the region extends. Therefore, if a preselected polarization is imparted to the impingent reading beam, the polarization of the reflected beam can be analyzed to determine the binary state of the datum stored in the region being read. For example, a separate laser diode 23, of lower output power than the output power of writing laser diode 18, may provide a beam 24 of light which is polarized by passage through a polarizing means 26. It should be understood that a single, variable-power laser diode can be used with known optics to provide both a lower-power polarized reading beam and a higher-power writing beam to essentially the same region 11d (which region is the union of the regions 11d-r and 11d-w as the distance along track 42 is reduced toward zero). The polarized beam 28 is focussed by lens means 30 to a diameter less than the diameter of region 11d-r, after passage through a beam-splitting means 32. The reflected beam 34, traveling in the direction of arrow E away from disk 11, is redirected by means 32. The redirected beam 36 is focussed, by lens means 38 and the like, upon the active portion of a detector means 40, which provides, at a disk data read output 40a, a logic output signal having a state commensurate with the state of the net magnetic moment of the region 11d-r being read.

The present invention facilitates the direct over-writing or erasing of previously written information in selected regions of the magneto-optic medium. The method employs the self-demagnetizing field created within a reheated region by the specially formulated thin film magneto-optic recording medium to reverse the net magnetization of the region and thus eliminates the requirement of the prior art for an externally applied bias magnetic field. The physical processes believed to be involved in the new method will be described hereinafter in conjunction with FIGS. 2a-2h but first, one-particular application (referred to as the "read before write" approach) of the self-inverting data modifying method of the present invention will be described.

In accordance with the invention, our read-before-write method to over-write the binary value of each bit of a multiplicity N of sequentially storable bits of a new data sequence over the binary value presently stored in each of the associated N sequential data storage regions, causes each associated region to be interrogated and the present value of the bit stored in that region to be read therefrom. The read-out data value is then compared with the new data value to be stored in that region. If the comparison indicates that the proper binary data value is already stored in the interrogated region $11d-r$, action is not necessary and comparison of the next sequential bit of new data is made against the value of the next data bit already stored in the magneto-optic media layer. If the comparison indicates that the wrong binary value is presently stored in the interrogated region, an over-write enable signal is provided to request heating of the interrogated region, to a temperature above the compensation temperature $T_c$ of the magneto-optic material (and in the absence of any substantial magnetic field external to the storage media layer and deliberately applied to reverse the net magnetic moment) to cause the actual net magnetic moment M in that region to be self-inverted and then be maintained in a stable magnetic domain. Because the disk is rotating, preferably at a well-regulated speed, the region $11d-r$ which was read will have moved from the location at which regions are read, along an imaginary circular track 42, to another position; the actual position at which over-writing of a region (now identified as a region $11d-w$ to be over-written) occurs should be somewhat beyond that required for a normal read-before-write decision sequence to occur, to allow for adjustments and the like. A time delay may be introduced to cause the over-write-enable signal, resulting from the read and compare operations, to enable the over-write energy source only at the time when the proper region has arrived at the position $11d-w$ at the focus of the over-write beam 15.

Figure 1B:
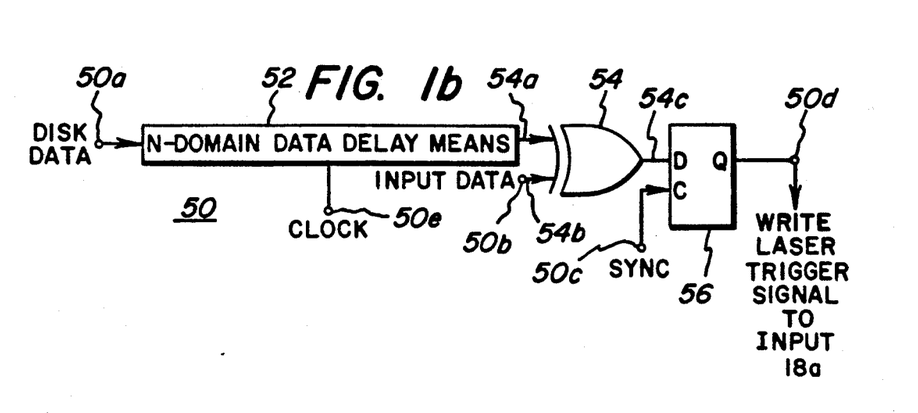
FIG. 1b is a schematic block diagram of a basic electronic circuit for use, with the apparatus of FIG. 1, in over-writing the digital values stored in a particular storage region.

The read-before-write (e.g., read-compare-delay-enable) operational sequence may be obtained at least in part, for example, by the functions of a subcircuit 50 such as is illustrated in FIG. 1b. The data read from the disk is, after suitable buffering and processing after output 40a, introduced at a first input 50a of the subcircuit. In one possible embodiment, the incoming data is first delayed, in a data delay means 52, for the time interval required for the region $11d-r$ in which the read magnetic domain resides position at which region $10d-w$ can be over-written. The delayed read data bit value is provided to a first input 54a of a comparison means 54, e.g., an exclusive-OR (XOR) gate. The incoming data bit value is provided to a second subcircuit input 50b and is coupled to the other input 54b of the XOR gate. If both gate inputs are of the same binary value, then gate output 54c will be at a first level, e.g., a logic zero state, while the output 54c will be at the opposite second level, e.g., the logic one state, only if both input states are different. The gate output is connected to the data D input of a flip-flop logic element 56, which receives a clock C input signal from a synchronization SYNC. signal subcircuit input 50c. This SYNC. signal is prepared, in manner well known to the arts, from at least those synchronization signals provided by formatting of the disk storage regions. Thus, the logic level at the comparison means output 54c is clocked through to the Q output of the flip-flop only at such time as that output signal should be properly present at the subcircuit output 50d, for coupling to the enabling input 18a of the laser/power supply, for causing a pulse of laser light to be focussed upon the associated storage region, which has now been moved from the location at which a region $11d-r$ is read to the location at which a region $11d-w$ is over-written. It should be understood that the comparison can be carried out first, as by connection of input 50a to gate input 54a, with placement of the delay means 52 after the comparison means and immediately prior to the synchronization means 56. It should also be understood that the delay means 52 can be positioned after the synchronization means 56. Further, it is preferable that the data delay means itself receive a clock signal, as at input 50e, recovered from the actual read data, to cause the desired N region, or domain, delay to occur without loss of accuracy. Additionally, another reading station (not shown) may be located after the overwriting station (of elements 18 and 19) to re-read the region and verify that the net magnetic moment of the domain has in fact been reversed and the value of the data bit stored in that region has been actually over-written.

Referring now to FIGS. 2a-2h, the process which we believe to be physically occurring for our self-inverting data over-write method (using the apparent self-demagnetizing field of the thin-film magneto-optic recording media) is illustrated. Prior to the time at which a first over-write operation is to occur, the media layer 60 is at an ambient temperature $T_a$ less than the compensation temperature $T_c$ of the magneto-optic material. The recording regions each contain one bit of a first set of data. FIG. 2a illustrates that, for the starting data set with the same data value, e.g., a binary one state, in each of three sequential regions (N-1), N and (N+1), the net magnetic moments (symbolized by the broad arrows 62a-62o) are all directed in the same (e.g., upward) direction substantially perpendicular to the media layer surface 60a and are all of approximately the same amplitude. The amplitude and direction of the net magnetic moment M is established by the relative amplitudes and direction of the magnetic moment of the individual components of the magneto-optic alloy. Here, the downwardly-directed moment 64a of the transition metal (TM) component of the alloy is of smaller amplitude than the upwardly-directed moment 64b of the rare earth (RE) alloy component, in each subregion.

As a region N receives energy from the overwriting means (laser 18) the temperature of that region is raised until the compensation temperature $T_c$ is exceeded. Because the impingent light beam 15 has a substantially Gaussian energy distribution, the entire region N is not uniformly heated. Thus, while the individual alloy component magnetic moments (e.g., moments 64a and 64b) and the net magnetic moments (e.g., net moments 62a, 62b, 62n and 62o) all remain substantially unchanged in subregions removed from the region N receiving energy, those subregions nearer to the heated region N receive energy from the fringes of the beam. Responsive to the increased temperature, which is less than the compensation temperature in these other regions (N-1), (N+1), etc., the magnetic moment 64c of the transition metal TM component is decreased by some amount, which is not as great as the decrease in the magnetic moment 64d of the rare earth RE component; the net moment (e.g., net moments $62c'$ and $62m'$) of that subregion is reduced. As the temperature increases, the reduction in the magnitude of the net magnetic moment (e.g., net moments 62d' and 62l') continues, responsive to the faster reduction of the RE moment 64f than the reduction in the TM moment 64e, with closer location to region N. In some subregions the compensation temperature is just attained and the reduced amplitudes of the TM and RE moments 64g and 64h become, by definition, equal; the net magnetic moment 62e',62k', ... are of zero magnitude (and define the periphery of the region N). Inward of the subregions with zero net magnetic moment, the subregion temperature exceeds the compensation temperature; the reduced amplitude of the TM moment (e.g., magnetic moments 64i, 64k, 64m, ...) is now larger than the reduced amplitude of the RE moment (e.g., magnetic moments 64j, 64l, 64m, ...) and the net magnetic moments (e.g., net moments 62f'-62j' ...) are all now reversed, having increasing magnitude but in the opposite direction (e.g., into the recording layer).

Figures 2D, 2E:
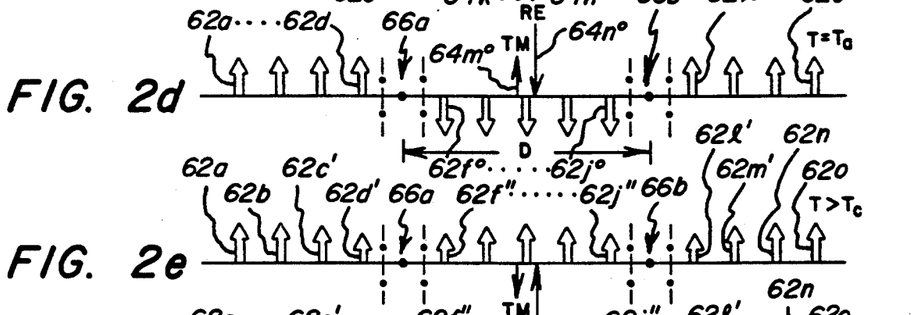

The self-demagnetizing field appears to be applied by those subregions still magnetized in the original (e.g., upward) direction; the component moment directions are now re-inverted (FIG. 2c) in those subregions still at a temperature greater than the compensation temperature. The component moments in subregions within, but adjacent to, the region N periphery remain fixed in the former direction (e.g., as shown by moments 64i and 64j) so that the net moment remains fixed in the new (now inverted) direction. The component moments in the more central subregions, however, are direction reversed to the original direction (e.g., the upward direction, as at net magnetic moments 62g'', 62h'', 62i'', ...). As the subregion temperature decreases upon cooling, after removal/off-switching of the light beam, the amplitudes of the alloy component magnetic moments increase to their ambient temperature values; as each subregion passes through the compensation temperature, the net magnetic moment 62 thereof is decreased to zero. As shown in FIG. 2d, in each subregion, at some temperature less than the compensation temperature, the RE magnetic moment (e.g., magnetic moment 64n°) amplitude is again greater than the amplitude of the TM magnetic moment (e.g., magnetic moment 64m°) and the direction of the net moment (e.g., net magnetic moment 62h°) is again in the same inverted direction. The rest of the region N subregions experience the same inversion of their net magnetic moments (e.g., net magnetic moments 62g°, 62i°, ...). Thus, the subregions of region N all have net magnetic moments aligned in a direction opposite to the alignment direction prior to the heating of the region N to a temperature greater than the compensation temperature. As the opposed moments nucleate a magnetic wall (as at the periphery subregions 66a and 66b upon opposite sides of region N), a stable magnetic domain is created, with diameter D, now storing the new value of the associated data bit.

Figures 2F, 2G:
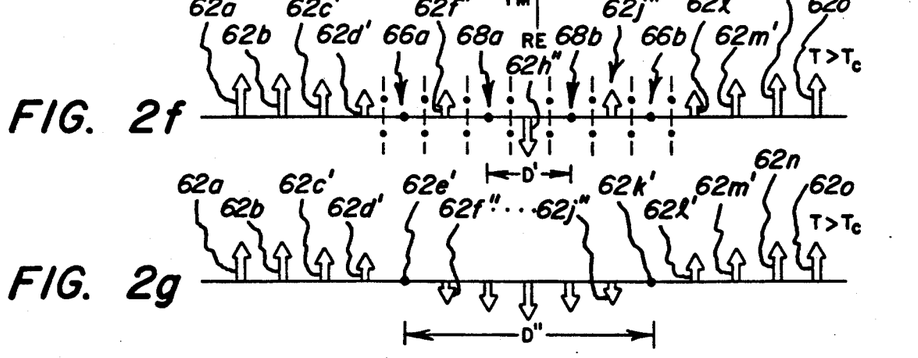
Figure 2H:
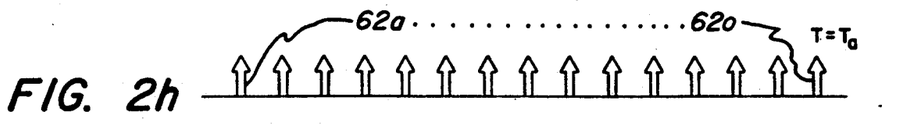

Referring now to FIGS. 2e-2h, at some later time, a comparison of the data value (e.g., a logic zero) stored in the domain and the logic value (e.g., a logic one) of a new bit of binary data for storage in domain N indicates that the region N must be over-written. This decision enables the write laser diode and causes region N to be again heated, in the absence of any substantial intentional external bias magnetic field, to a temperature in excess of the compensation temperature. The domain wall, as exemplified by wall portions 66a and 66b of FIG. 2e, is not abruptly destroyed; there is an inversion of the net magnetic moments 62 of the subregions within region N, due to the reversal of the alloy component magnetic moment dominance. Thus, the net magnetic moments 62f''-62j'', of those subregions within the heated region N, are not only modified in amplitude by the Gaussian energy distribution of the impinging light beam, but are also inverted in direction, to point upwardly and away from the magneto-optic material layer. The self-demagnetizing field of the immediately-adjacent subregions (e.g., the upwardly directed net moments of the subregions 62f'' and 62j''') cause a reversal in the local magnetic field in the center subregion(s), as here represented by subregion 62h''', of the heated region N, as shown in FIG. 2f, so that at least one of the interior subregions now has the net magnetic moment thereof directed in an again-inverted direction (e.g., the downwardly directed net magnetic moment 62h''' of a smaller region, of diameter D', less than region/domain diameter D, within the larger domain/region N). A second, inner domain wall, as shown by opposed wall portions 68a and 68b, is now present about the subregion periphery. Local wall motion causes the portions of the inner wall to expand to the locations of the associated portions of the outer wall; the two walls meet and mutually annihilate one another, so that the diameter D'', of the region in which the net magnetic moments 62g''-62i'' (see FIG. 2g) are still inverted, is greater than the domain diameter D'. As the temperature of the region N is decreased to below the compensation temperature, by cooling after cessation of the heating pulse, the relative amplitudes of the RE and TM alloy component magnetic moments change and the subregion net magnetic moments are again all directed in the same direction (e.g., the upward direction for net magnetic moments 62e-62k, of FIG. 2h). The data value stored in region N has, therefore, been inverted (e.g., to a logic one value) from the state of the data value (e.g., the logic zero value) previously stored in that region.

While presently preferred embodiments of our novel method, recording material and system for over-writing the binary data value stored in a region of a magneto-optic thin-film recording layer have been described herein, many modifications and variations will now become apparent to those skilled in the art. It is our intent, therefore, to be limited only by the scope of the appending claims and not by the specific details and instrumentalities presented herein as illustrations.

What we claim is:

1. A method of selectively modifying information stored in a small region of a recording medium in a magneto-optic disk comprising the steps of:

providing a thin-film layer of ferrimagnetic material as said recording medium having a compensation temperature a few tens of degrees centigrade above room temperature;

creating said small region in said recording medium surrounded by a magnetic domain wall, said small region having a direction of magnetization opposite to the direction of magnetization in the region immediately outside said magnetic domain wall;

associating the information with an existing direction of net magnetization of said small region at ambient temperature; and irradiating said small region with a beam of energy, said beam imparting sufficient energy to said small region to temporarily raise the temperature of at least part of said small region above said compensation temperature to cause self inversion of the direction of net magnetization exhibited by at least a portion of said small region after cooling to ambient temperature without requiring the use of both external magnetic bias field and internal biasing layer to erase said small region in said medium, whereby the information stored in said small region is modified.

2. The method of claim 1 wherein said ferrimagnetic material comprises an amorphous alloy of at least one rare-earth element and at least one transition-metal element, said alloy having a compensation temperature substantially a few tens of degrees centigrade higher than room temperature.

3. The method of claim 1 wherein said ferrimagnetic material is the sole magnetic constituent of the medium.

4. The method of claim 1 wherein said recording medium has substantially homogenous magnetic properties throughout its depth, and wherein said irradiating step temporarily raises the temperature beyond said compensation temperature.

5. A method of reversing net magnetization in a selected region initially surrounded by a magnetic domain wall of a magneto-optic recording medium without requiring an externally applied bias magnetic field and internal biasing layer for reversing said net magnetization, said method comprising:
providing a thin film layer of ferrimagnetic material as said medium having a compensation temperature sufficiently above room temperature to permit reversal of direction of net magnetization in a selected region initially surrounded by said magnetic domain wall of the recording medium;
creating said selected region in said recording medium surrounded by said magnetic domain wall; and
temporarily heating said selected region to a temperature above said compensation temperature and employing the internal magnetic forces created by the heated region itself to reverse the net magnetization in said selected region.

6. A method of reversing the net magnetization of a selected previously magnetized local region of a thin film magneto-optic recording medium, comprising the steps of:
employing a ferrimagnetic material having a perpendicular uniaxial anisotropy as the recording medium such that net magnetizations of regions of the medium lie normal to a plane containing said thin film medium;
recording a domain by creating said selected local region so that said selected local region is magnetized and surrounded by a magnetic domain wall such that said selected local region maintains a direction of magnetization opposite to direction of magnetization in the region immediately outside said magnetic domain wall; and
erasing said selected region of reversed magnetization by temporarily heating said created selected local region, without requiring an external magnetic biasing field and an internal bias layer for erasing said domain, to an elevated temperature at which the coercivity of the material in the created selected local region is low enough such that the internal magnetic forces created by the medium reverse the net magnetization of said selected region.

7. The method of claim 6 wherein said ferrimagnetic material comprises an amorphous ferrimagnetic rare-earth transition-metal alloy.

8. The method of claim 7 wherein said alloy has a compensation temperature a few tens of degrees centigrade higher than room temperature.

9. The method of claim 8 wherein said heating step comprises focusing a pulsed laser beam on said created selected local region for initially heating the created selected local region from ambient temperature to a temperature above the compensation temperature and subsequently allowing the temperature in the region to cool down to ambient temperature, whereby the net magnetization in the region passes through the compensation temperature both prior to and subsequent to the reversal caused by said internal magnetic forces.

10. The method of claim 7 wherein said medium consists essentially of said alloy.

11. A method of modifying information associated with a first domain of a magneto-optic recording medium having a ferrimagnetic thin film without requiring an external magnetic bias field and internal magnetic bias layer, said first domain being surrounded by a first magnetic domain wall and having an initial net magnetic moment in a first direction, comprising the steps of:
producing a second smaller domain within said first domain, said second domain being surrounded by a second magnetic domain wall, and
supplying heating radiation to cause the wall of said second domain to meet and annihilate at least a section of the wall of the first domain whereby the initial direction of the net magnetic moment in at least a portion of the first domain is reversed and information associated with said portion is modified.

12. The method of claim 11 wherein said second domain is produced by local thermal heating in conjunction with a self-demagnetizing field produced by the heated medium.

13. The method of claim 12 wherein said local thermal heating is provided by a focused laser beam having a substantially Gaussian shaped transverse thermal profile.

14. The method of claim 12 wherein said recording medium comprises a ferrimagnetic material having a compensation temperature substantially a few tens of degrees centigrade above room temperature.

15. The method of claim 14 wherein said ferrimagnetic material comprises an amorphous alloy of at least one rare-earth element and at least one transition-metal element.

16. A magneto-optic recording system comprising:
a thin film ferrimagnetic medium having its net magnetization perpendicular to a surface of the film and a compensation temperature sufficiently above room temperature to facilitate self reversal of the direction of net magnetization exhibited at ambient temperature of a local region of the film which is initially surrounded by a magnetic domain wall an which has a magnetization reversed with respect to an initial magnetization direction of the medium; and
means for heating said local region of reversed net magnetization surrounded by said magnetic domain wall above the compensation temperature to require only the internal magnetic forces created by the heated region to again reverse the net magnetization of said region when allowed to cool down to ambient temperature.

17. The magneto-optic system of claim 16 wherein said compensation temperature of said ferrimagnetic medium is selected to be a few tens of degrees centigrade above room temperature.

18. The magneto-optic system of claim 17 wherein said medium comprises an amorphous ferrimagnetic rare-earth transition-metal alloy.

19. The magneto-optic system of claim 17 wherein said ferrimagnetic medium consists essentially of a single layer.

20. The magneto-optic system of claim 17 wherein said medium has temperature dependent magnetic properties which are substantially uniform throughout the depth of the medium.

21. A magneto-optic recording disk system comprising:
a discoidal substrate member formed of a substantially magnetic material, said member having a pair of generally circular, substantially parallel, spaced apart surfaces;
a thin film magneto-optic recording material overlying at least one of said surfaces, said material being formulated to exhibit a perpendicular uniaxial anisotropy, such that a net magnetization of the material lies normal to said at least one surface, and said material having a compensation temperature sufficiently above room temperature to permit reversal of the direction of net magnetizations of regions each of which is surrounded by a magnetic domain wall and has a magnetization of direction reversed with respect to an initial magnetization direction of the medium; and
means for temporarily heating a selected region of said recording material surrounded by a magnetic domain wall of said regions to an elevated temperature beyond said compensation temperature and then allowing said region to cool down to ambient temperature to again reverse the direction of net magnetization in said region without depending upon an application of an external magnetic bias field and a magnetic biasing layer within said recording disk.

22. The system of claim 21 wherein said recording material has a compensation temperature a few tens of degrees centigrade above room temperature.

23. The system of claim 22 wherein said recording material is ferrimagnetic and amorphous.

24. The system of claim 23 wherein said recording material comprises an alloy of at least one rare-earth element and at least one transition-metal element.

25. The system of claim 21 wherein said thin film of said recording material overlies each surface of the substrate member.

26. The system of claim 21 wherein said thin film comprises a single layer of material, and said single layer affords both a data storage function and the reversal of net magnetization direction function.

27. A method of successively reversing an instantaneous net magnetization in a selected region of a magneto-optic recording medium without requiring an external magnetic field and an internal magnetic bias layer, said method comprising:
employing a ferrimagnetic thin film with net magnetization perpendicular to a plane containing said film as the recording medium, said film for producing a localized self demagnetizing field within said selected region when said selected region is heated to an elevated temperature higher than a compensation temperature of the film; and
successively irradiating said selected region of the film with pulsed beams of energy, each pulsed beam serving to temporarily heat said selected region from ambient temperature to a temperature higher than said compensation temperature at which said localized self demagnetizing field created by the heated region in said thin film reverses said instantaneous net magnetization of said selected region, and allowing the region to cool down to ambient temperature between said successive irradiations, whereby the net magnetization of the region is repeatedly reversed.

28. The method of claim 27 wherein a single layer ferrimagnetic thin film is employed as the recording medium.

29. A magneto-optic recording system comprising:
a thin film magneto-optic recording medium having its net magnetization perpendicular to a plane containing said thin film medium, said medium being formulated to exhibit self inversion of the direction of net magnetization in at least a portion of a selected region surrounded by a magnetic domain wall thereof at an elevated temperature above a compensation temperature of said medium in the absence of an externally applied bias magnetic field, and internally applied bias layer;
recording means for creating said selected region surrounded by a magnetic domain wall, said selected region having a direction of magnetization opposite to direction of magnetization in the region immediately outside said magnetic domain wall; and
erasing means for temporarily irradiating at least portions of said selected region with electromagnetic radiation imparting sufficient energy to heat at least said portions from ambient temperature to said elevated temperature whereby the net magnetization of at least said portions is reversed without requiring an externally applied bias magnetic field and internal biasing layer for erasing said selected region surrounded by a magnetic domain wall when said selected region is cooled down to ambient temperature.

30. A method of selectively modifying information stored in a small region of a magneto-optic disk comprising the steps of:
providing a thin-film layer of ferrimagnetic material as a recording medium having a compensation temperature sufficiently above room temperature to permit reversal of direction of net magnetization in said small region;
creating said small region in said recording medium so that said small region is surrounded by a magnetic domain wall, and so that said small region has a first direction of magnetization opposite to a second direction of magnetization in a region immediately outside said magnetic domain wall;
associating the information with an existing direction of net magnetization of said small region at ambient temperature; and
irradiating said small region with a beam of energy, said beam imparting sufficient energy to said small region to temporarily raise the temperature of at least part of said small region above said compensation temperature to cause self inversion of the direction of net magnetization exhibited by at least a portion of said small region after cooling said small region to ambient temperature without requiring an external magnetic bias field and an internal bias layer, each having a direction of said second direction of magnetization, applied to said medium to erase said small region in said medium, whereby the information stored in said small region is modified.

31. A magneto-optic recording system comprising:

a thin film magneto-optic recording medium having its net magnetization perpendicular to a plane containing said thin film medium, said medium being formulated to exhibit self inversion of the direction of net magnetization in at least a portion of a selected region surrounded by a magnetic domain wall thereof at an elevated temperature above a compensation temperature of said medium;

writing means for creating said selected region surrounded by a magnetic domain wall, said selected region having a first direction of magnetization opposite to a second direction of magnetization in a region immediately outside said magnetic domain wall; and erasing means for temporarily irradiating at least portions of said region surrounded by a magnetic domain wall, with electromagnetic radiation imparting sufficient energy to heat at least said portions from ambient temperature to said elevated temperature whereby the net magnetization of at least said portions is reversed to said second direction of magnetization without requiring an external magnetic bias field and an internal bias layer, each having a direction of said second direction of magnetization, applied to said medium for erasing said region surrounded by magnetic domain wall during cooldown of said region to ambient temperature.

* * * * *

UNITED STATES PATENT AND TRADEMARK OFFICE
CERTIFICATE OF CORRECTION

PATENT NO. : 5,184,335
DATED : February 2, 1993
INVENTOR(S) : Mark H. Kryder, et al.

It is certified that error appears in the above-identified patent and that said Letters Patent is hereby corrected as shown below:

On the title page, item (63), under Related U.S. Application Data:

Change the filing date of the Continuation-in-part application Serial No. 33,931 from "April 4, 1987" to --April 3, 1987--.

Change the filing date of the Continuation Application Serial No. 837,130 from "March 19, 1986" to --March 7, 1986--.

Column 10:
In Claim 16, line 8, after the word "wall", change "an" to --and--.

Signed and Sealed this

First Day of February, 1994

*Attest:*

BRUCE LEHMAN

*Attesting Officer*     Commissioner of Patents and Trademarks